United States Patent
Crary et al.

(10) Patent No.: US 6,311,675 B2
(45) Date of Patent: Nov. 6, 2001

(54) VENT VALVE AND FUEL PUMP MODULE

(75) Inventors: Lynwood F. Crary, Preston; Mark R. Johansen, Wallingford, both of CT (US)

(73) Assignee: Walbro Corporation, Cass City, MI (US)

( * ) Notice: Subject to any disclaimer, the term of this patent is extended or adjusted under 35 U.S.C. 154(b) by 0 days.

(21) Appl. No.: 09/755,478

(22) Filed: Jan. 5, 2001

Related U.S. Application Data

(63) Continuation-in-part of application No. 09/300,929, filed on Apr. 28, 1999, now Pat. No. 6,213,100.

(51) Int. Cl.[7] .................................................. F02M 37/04
(52) U.S. Cl. ........................ 123/516; 123/509; 137/43; 137/202
(58) Field of Search ..................................... 123/516, 509, 123/514, 518; 137/202, 43, 410, 387; 141/59, 46

(56) References Cited

U.S. PATENT DOCUMENTS

| | | | |
|---|---|---|---|
| 4,991,615 | * 2/1991 | Szlaga et al. | 137/43 |
| 5,044,389 | * 9/1991 | Gimby | 137/39 |
| 5,146,901 | * 9/1992 | Jones | 123/516 |
| 5,172,714 | * 12/1992 | Kobayashi et al. | 137/39 |
| 5,183,087 | * 2/1993 | Aubel et al. | 123/518 |
| 5,261,439 | * 11/1993 | Harris | 137/43 |
| 5,755,252 | * 5/1998 | Bergsma et al. | 137/202 |
| 5,809,976 | * 9/1998 | Cook et al. | 123/516 |
| 6,085,771 | * 7/2000 | Benjey et al. | 137/15.26 |
| 6,145,532 | * 11/2000 | Tuckey et al. | 137/202 |

* cited by examiner

Primary Examiner—Carl S. Miller
(74) Attorney, Agent, or Firm—Reising, Ethington, Barnes, Kisselle, Learman & McCulloch, P.C.

(57) ABSTRACT

A high flow rate, two stage fuel vapor vent valve assembly utilizing two float valves that provide a progressive closing of a vapor outlet to control the venting of fuel vapors from a fuel tank and the addition of liquid fuel to the tank. A first float closes a portion of the vapor outlet in response to liquid fuel at a first level relative to the valve. A second float closes the remainder of the vapor outlet in response to liquid fuel at a second level higher than the first level. One or more separate baffles are constructed and arranged to prevent the escape of liquid fuel through the vapor outlet.

30 Claims, 5 Drawing Sheets

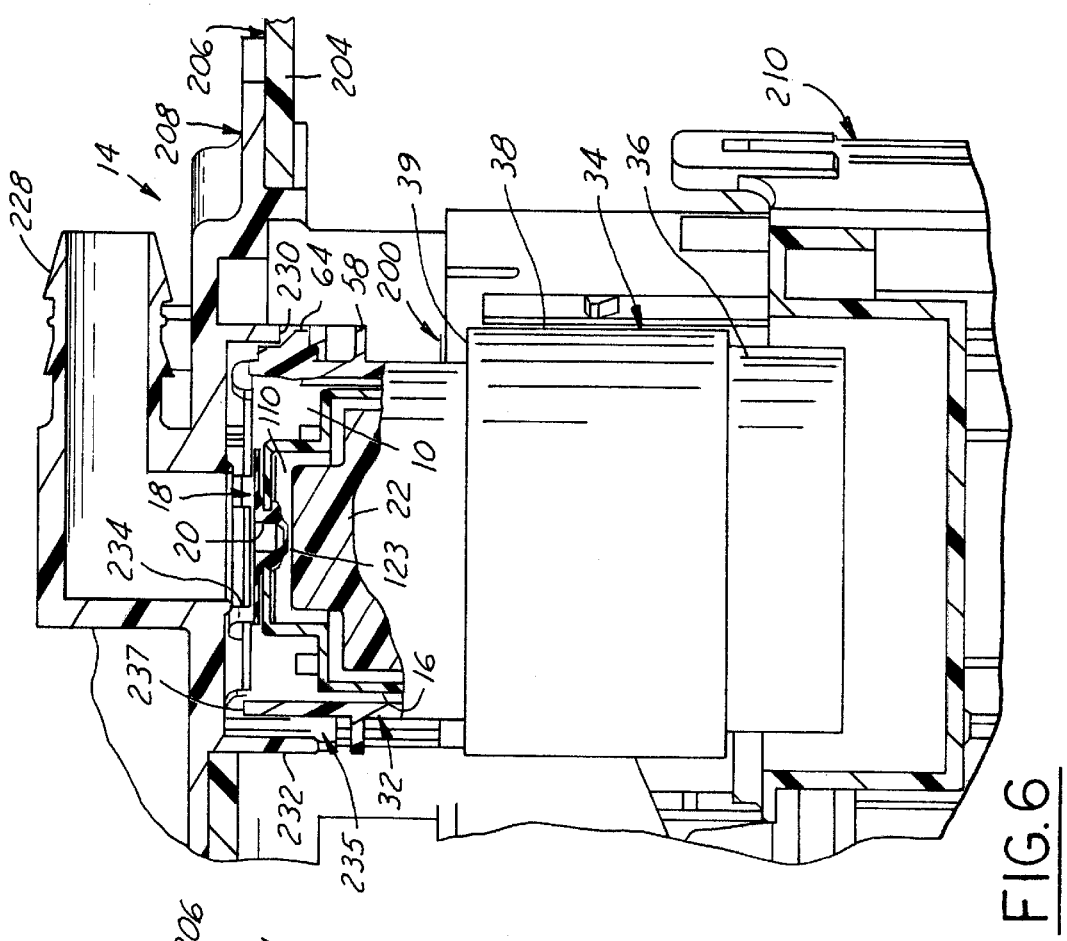
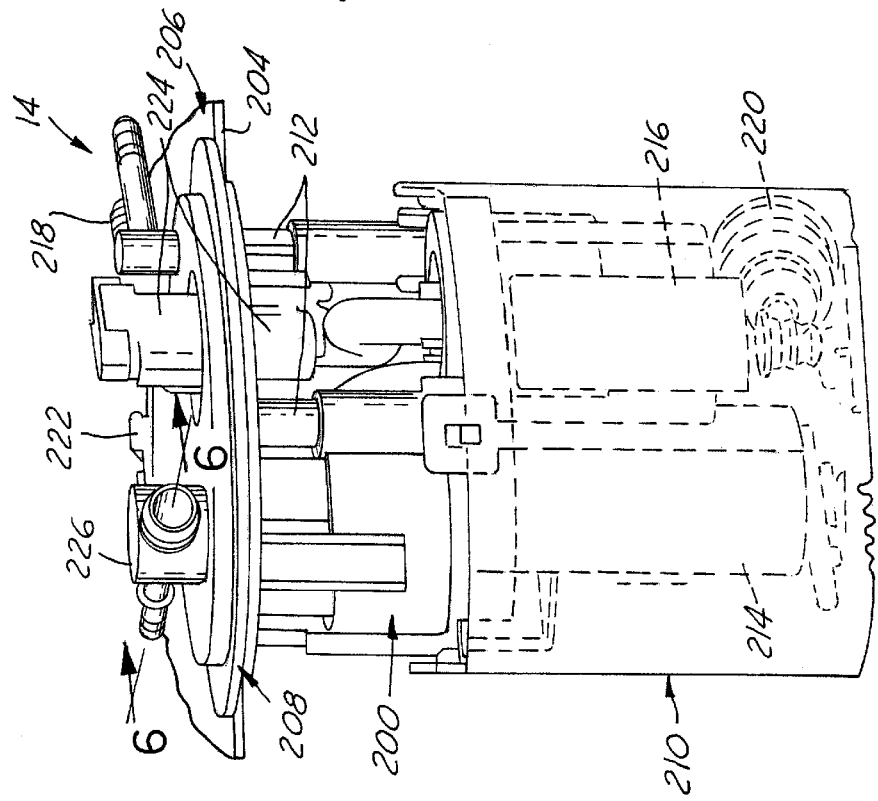
FIG.6
FIG.5

VENT VALVE AND FUEL PUMP MODULE

REFERENCE TO CO-PENDING APPLICATION

This patent application is a continuation-in-part of U.S. Pat. application Ser. No. 09/300,929, filed on Apr. 28, 1999 Now U.S. Pat. No. 6,213,100.

FIELD OF THE INVENTION

This invention relates generally to vehicle fuel systems and more particularly to a vapor vent valve for a vehicle fuel tank and a fuel pump module incorporating such a vapor vent valve.

BACKGROUND OF THE INVENTION

Environmental concerns and governmental regulations require reduced emissions of volatile hydrocarbon fuel vapors into the atmosphere. One source of hydrocarbon fuel vapors is fuel tanks of vehicles using gasoline or other hydrocarbon fuels with high volatility. Fuel vapor can escape to the atmosphere during the filling of the tanks and usually, even after the tanks are filled. The use of an onboard vapor recovery system to remove excess fuel vapor from the fuel tank is one solution to the problem. Typically, a canister with activated charcoal therein receives fuel vapors through a valve assembly mounted in the top of the fuel tank and communicates with the intake manifold of the vehicle engine for withdrawing fuel vapor from the canister during operation of the engine. The valve assembly may have a valve responsive to the level of fuel in the tank that enables the valves to stay open at a sufficiently low fuel level to permit fuel vapors to flow from the fuel tank into the canister. As the fuel level rises during filling to approach a desired maximum fuel level or quantity of fuel in the tank, a float is raised to close the valve to prevent liquid fuel from flowing through the valve and into the vapor canister. The closed valve also prevents fuel vapor from flowing into the vapor canister. One such system is disclosed in U.S. Pat. No. 5,579,802.

Some of these systems require a high capacity or high flow rate to control the flow of vapor from the fuel tank to the vapor storage canister. Current high capacity or high flow rate valve designs tend to be forced into and held in a closed position, when they should be open, by the vapor pressure in the fuel tank. This prevents vapor from flowing through the valve and into the vapor storage canister defeating the purpose of the system. Further, prior fuel level and vapor vent valves utilize a single float responsive to the fuel level in the fuel tank to close the valve. This single float arrangement maintains the valve closed while the fuel level remains at or near the desired maximum level of fuel in the tank to limit the amount of liquid fuel which undesirably escapes through the valve. Maintaining the valve closed while the fuel level remains at or near the maximum level of fuel in the tank is undesirable because the addition of fuel to the tank when the valve is closed will increase the pressure within the tank and increase the discharge of hydrocarbon fuel vapors into the atmosphere.

Further, when a vehicle stops, turns rapidly or is travelling across rough terrain significant splashing or sloshing of fuel in the fuel tank can occur. It has been found that the splashing and sloshing of fuel in the tank is particularly bad when the tank is between ¼ and ¾ full. Conventional vapor vent valves permit an undesirable amount of liquid fuel to escape from the fuel tank through the vent valve whereupon it flows to the fuel vapor canister which has a limited volume and storage capacity and is rapidly filled by liquid fuel. Typically, the liquid fuel escapes from conventional vent valves because the outlet thereof is not adequately protected from sloshing or splashing fuel and the valve closure mechanism is not responsive enough to rapidly close the valve and prevent such liquid fuel escape.

Typical vapor vent valves are mounted within an opening through the vehicle fuel tank, and a fuel pump is mounted through a separate opening in the fuel tank. Additional openings through the fuel tank may be provided to mount additional components such as an overpressure relief valve and the like. Each opening through the fuel tank provides a leak path through which hazardous hydrocarbon fuel vapors may escape to the atmosphere.

SUMMARY OF THE INVENTION

A high flow rate, two stage fuel vapor vent valve assembly utilizing two float valves that provide a progressive closing of a vapor outlet to control the venting of fuel vapors from a fuel tank and the addition of liquid fuel to the tank. A first float closes a portion of the vapor outlet in response to liquid fuel at a first level relative to the valve. A second float closes the remainder of the vapor outlet in response to liquid fuel at a second level higher than the first level. One or more separate baffles are constructed and arranged to prevent the escape of liquid fuel through the vapor outlet.

Preferably, to reduce the number of openings in the fuel tank and to simplify manufacture and assembly of the vapor vent valve assembly, it can be formed at least in part as an integral portion of a fuel pump module disposed within the fuel tank. Ideally, an upper portion of the vent valve assembly defining the vapor outlet can be formed as an integral portion of a flange of the fuel pump module sealed to the fuel tank. This eliminates a leak path around a body of the vent valve assembly defining the vapor outlet to reduce the likelihood of liquid fuel escaping from the fuel tank. Still further, providing the vapor vent valve assembly integral with the fuel pump module prevents damage to the vapor vent valve assembly should a lower portion of the fuel pump module, containing the fuel pump, break away from the upper flange sealed to the fuel tank during a vehicle accident.

Objects, features, and advantages of this invention include providing a vapor vent valve assembly and fuel pump module which has a high flow rate or capacity, opens and closes in response to the level of fuel in the tank, prevents liquid fuel from escaping from the fuel tank to the vapor receiving canister, closes in a vehicle roll-over condition, limits the maximum level of fuel within the fuel tank during filling, enables multiple shut-offs of a fuel filler nozzle during filling of the fuel tank, at least substantially prevents sloshing or splashing liquid fuel from escaping through the vapor outlet, and is rugged, durable, reliable, of relatively simple design and economical manufacture and assembly and has a long useful life in service.

BRIEF DESCRIPTION OF THE DRAWINGS

These and other objects, features and advantages of this invention will be apparent from the following detailed description of the preferred embodiments and best mode, appended claims and accompanying drawings in which:

FIG. 5 is a perspective view of a fuel pump module which carries a vapor vent valve assembly according to the invention;

FIG. 6 is a fragmentary sectional view of the fuel pump module illustrating the vapor vent valve assembly;

DETAILED DESCRIPTION OF THE PREFERRED EMBODIMENTS

Figure 1:
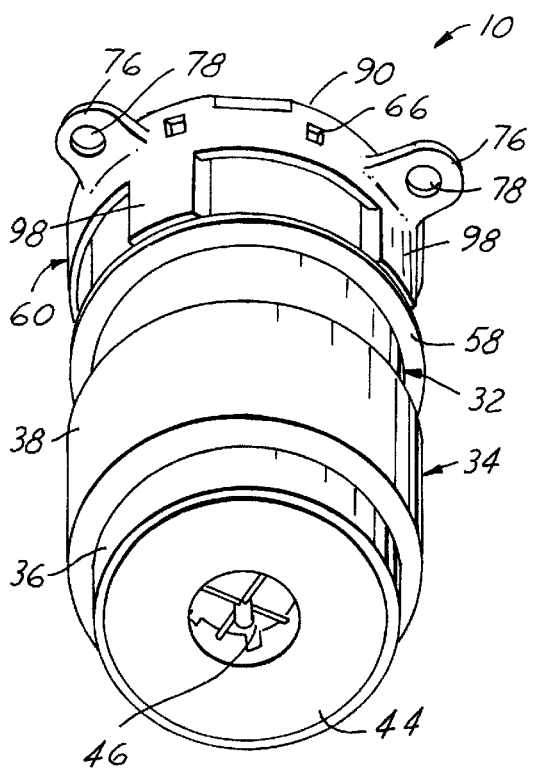
FIG. 1 is a perspective view of a vapor vent valve assembly according to the invention and illustrating a lower portion of the assembly.
Figure 2:
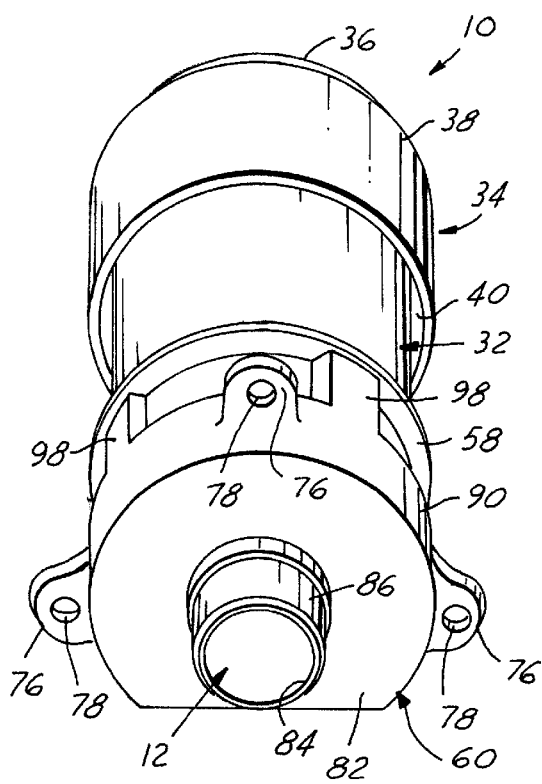
FIG. 2 is a perspective view of the vapor vent valve assembly of FIG. 1 illustrating an upper portion of the assembly.
Figure 3:
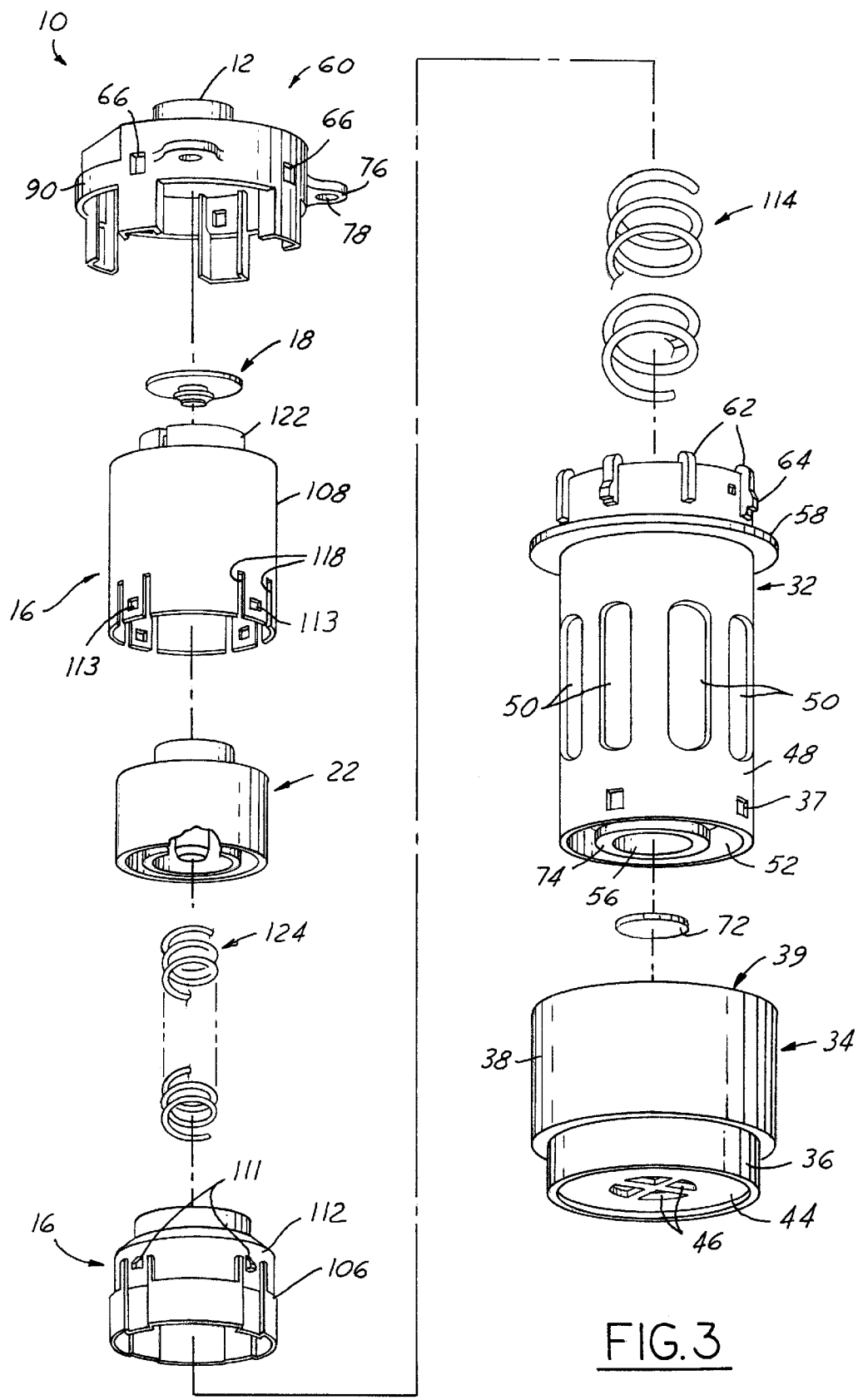
FIG. 3 is an exploded assembly view of the vapor vent valve assembly.
Figure 4:
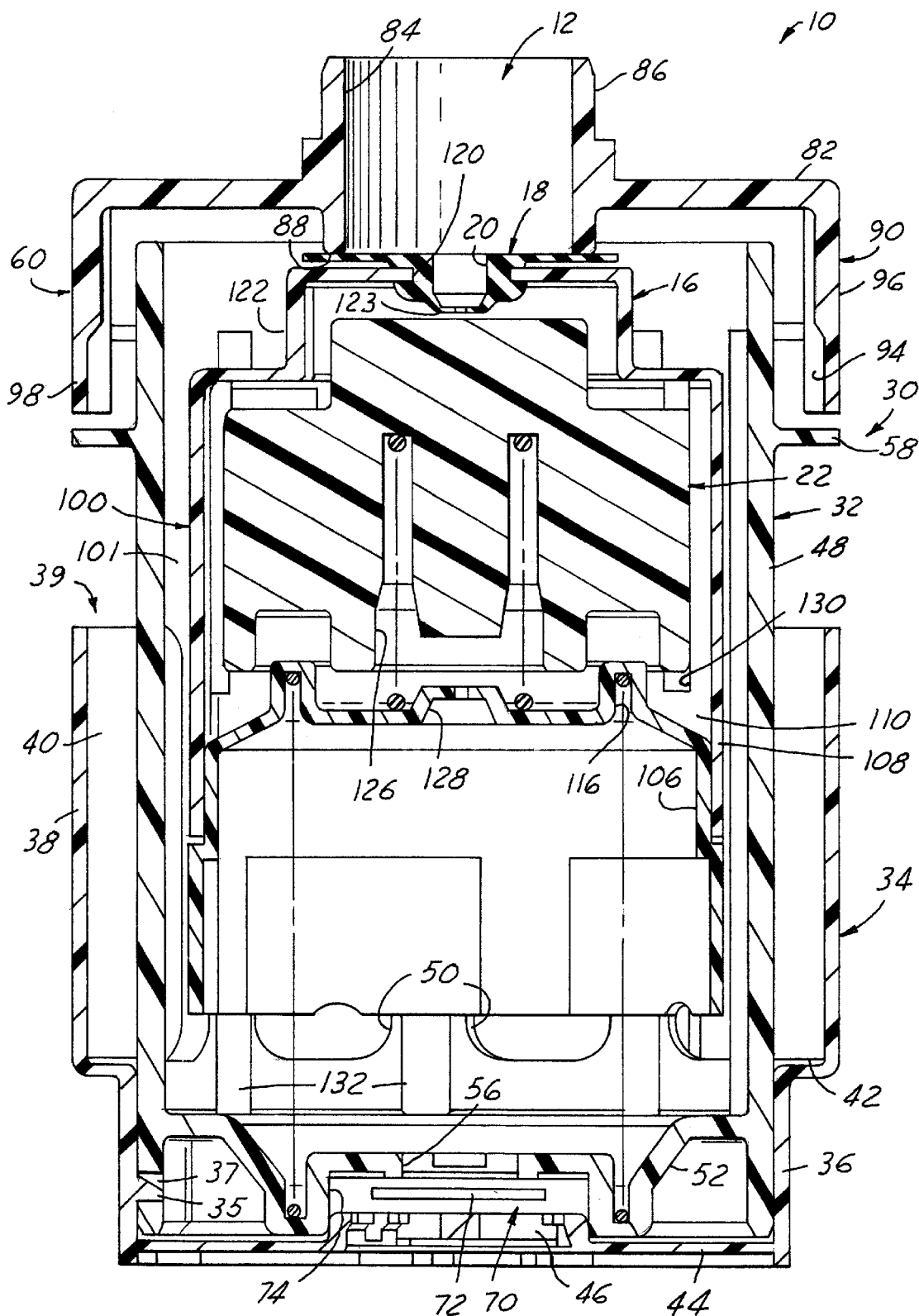
FIG. 4 is a cross-sectional view of the vapor vent valve assembly.

Referring in more detail to the drawings, FIG. 1 illustrates a fuel vapor vent valve 10 constructed to be mounted on a fuel tank, to communicate with the interior of the fuel tank and to selectively permit fuel vapor to flow out of the fuel tank through a vapor outlet 12 of the vent valve 10. The vapor vent valve 10 may be a stand alone component which can be separately mounted on the fuel tank or, as shown in FIGS. 5 and 6, may be incorporated as a portion of a fuel pump module 14 mounted on the fuel tank. As shown in FIGS. 3 and 4, the vent valve 10 has a first float 16 which carries a closure 18 engageable with the vapor outlet 12 to substantially close the outlet 12. The closure 18 has a passage 20 formed therethrough to permit a controlled flow of vapor through the outlet 12 even when the closure 18 is engaged therewith. The vapor vent valve 10 also has a second float 22 moveable relative to the first float 16 and adapted to selectively close off fluid flow through the passage 20 of the closure 18 to prevent fluid flow out of the vapor outlet 12 of the valve 10.

Desirably, this two-stage shut off of the vapor outlet 12 also controls the filling of the fuel tank. When the closure 18 engages the vapor outlet 12, vapor flow out of the tank is restricted and the pressure within the tank increases. This causes fuel to back up within a fill pipe of the fuel tank, with liquid fuel closing off a control port of a refueling nozzle of a fuel station fuel dispensing pump to actuate an automatic shut-off device in the nozzle in a known manner and prevent additional fuel from being added to the tank. The closure 18 may move away from the vapor outlet 12 and/or the fuel vapor in the tank may vent through the passage 20 of the closure 18 to reduce the pressure in the tank. Thus, additional fuel can be added to the tank even after the first shut-off event. Subsequent shut-off events are caused by reengagement of the closure with the vapor outlet 12 or the closing off of the passage 20 of the closure 18 by the second float 22 at a maximum fill level of the fuel tank. Desirably, this prevents overfilling of the fuel tank and maintains a vapor dome in the upper portion of the fuel tank and in communication with the vapor vent valve 10. Usually, the closure 18 remains engaged with the vapor outlet 12 and does not move away after the initial shut-off event. Further venting and shut-off events are controlled through passage 20.

The vapor outlet 12 of the vent valve 10 typically communicates with a fuel vapor canister downstream of the vent valve and the fuel tank. The canister is filled with activated charcoal to absorb the hydrocarbon vapors received from the valve assembly. The canister has an outlet through which fuel vapor is discharged to an intake manifold of an engine for combustion of the fuel vapors in the normal combustion cycle of the engine. The canister may be mounted in various locations in the vehicle and is connected to the vent valve 10 by a suitable flexible hose.

The vent valve 10 has a housing 30 defined in part by a generally cylindrical and tubular shell 32 and an outer fill cup 34 surrounding a portion of the shell 32. The fill cup 34 has a reduced diameter base 36 in which the shell 32 is closely received preferably, as shown in FIG. 4, by a snap-fit of flexible fingers 35 on the fill cup 34 disposed into complementary slots 37 in the shell 32. An enlarged diameter sidewall 38 extends from the base 36 to an open end 39 of the fill cup defining an annular gap 40 between the sidewall 38 and the shell 32. The sidewall 38 is open at its upper end 39 to permit liquid fuel to flow over the sidewall 38 and into the gap 40. A plurality of radially inwardly and axially extending ribs 42 may be formed in the sidewall 38 to position the shell 32 therein. The fill cup 34 has a bottom wall 44 which spans the base 36 with through holes 46 permitting fluid flow therethrough. The fill cup 34 and shell 32 are preferably formed of a material resistant to degradation from exposure to hydrocarbon fuels, and are preferably a polymeric material such as Acetal.

The shell 32 has a sidewall 48 in which a plurality of slots 50 are formed to permit liquid fuel to flow readily through the shell 32. The slots 50 preferably extend at an axially height equal to or below the height of the sidewall 38 of the fill cup 34 so that the sidewall 38 shields or protects against splashing fuel travelling upwardly relative to the vent valve 10 and through the slots 50 to prevent such upwardly travelling fuel from escaping out of the vent valve 10. A bottom wall 52 of the shell 32 substantially closes off its lower end with one or more through holes 56 permitting fluid flow therethrough.

A radially outwardly extending and preferably circumferentially continuous flange 58 is provided on the sidewall 48 above the slots 50 of the shell. The flange 58 extends sufficiently radially outward to direct any liquid fuel which lands on top of the flange 58 away from the fill cup 34 to return such fuel to the fuel tank. To facilitate locating and connecting an upper cap 60 to the shell 32, a plurality of radially outwardly extending tabs 62 (FIG. 3) are provided at the upper end of the shell 32 extending out of the cup 34. At least some of these tabs 62 have radially outwardly extending catches 64 constructed to snap-fit into complimentary openings 66 in the cap 60. The remaining tabs 62 provide additional separation between the cap 60 and sidewall 48 to provide flow paths between them through which fuel vapor may flow into the valve 10. Desirably, a check valve 70 controls the flow of fluid through the holes 46, 56 of the bottom walls 44, 52 of the cup 34 and shell 32. The check valve 70 may be a generally flat disc 72 disposed between the bottom walls 44, 52 and retained and located by a circular recess 74 formed in the bottom wall 52 of the shell 32. Desirably, the disc 72 is responsive when acted on by liquid fuel to close the openings 56 in the bottom wall 52 of the shell 32 and prevent liquid fuel flow from the fuel tank through these openings 56. When the disc 72 is not immersed in liquid fuel, any fuel within the shell 32 may flow out of the valve 10 through the openings 56, past the disc 72 and back into the fuel tank.

The cap 60 preferably has a plurality of radially outwardly extending mounting tabs 76 with through holes 78 constructed to receive pins (not shown) on the fuel tank which locate the vent valve 10 relative to the fuel tank and which may be heat staked to mount and seal the vent valve 10 to the fuel tank. The cap 60 has an upper wall 82 with a throughbore 84 defining the vapor outlet 12 through which fuel vapor may escape from the fuel tank through the vent valve 10. The vapor outlet 12 is defined in part by a nipple 86 extending from the upper wall 82 to receive a suitable conduit communicating the vent valve 10 with a fuel vapor canister or the like. Additionally, an annular depending valve seat 88 may be provided surrounding the outlet 12. The cap 60 has a circumferential depending skirt 90 extending from its upper wall 82 and surrounding an upper portion of the shell 32 in assembly. A plurality of slots 66 are formed in the skirt 90 each adapted to receive a catch 64 of a separate one of the tabs 62 on the shell 32 to connect and retain the cap 60 to the shell 32. The flange 58 on the sidewall 48 of the shell 32 is preferably disposed adjacent to the lower edge of the skirt 90 with the flange 58 extending radially outwardly at least to the extent of an inner surface 94 of the skirt 90 and desirably at least to and preferably farther outwardly than an outer wall 96 of the skirt 90 to inhibit and preferably prevent splashing or sloshing liquid fuel from flowing between the skirt 90 and shell 32 and through the outlet 12 out of the valve 10. The cap may also have finger-like shrouds 98 extending from the skirt in the area of the slots 66 to provide a further shield from sloshing fuel.

To control the flow of fluid through the vent valve 10, a float assembly 100 is slidably received in an interior space 101 defined between the shell 32 its bottom wall 52 and the cap 60. The float assembly 100 comprises the first float 16 and second float 22 slidably received within the hollow first float 16. The first float 16 is preferably defined by a pair of inverted cup shaped bodies 106, 108 preferably interconnected by a snap-fit to define an inner chamber 110 in which the second float 22 is received. The lower body 106 may have a reduced diameter nose 112 adapted to be received within the upper body 108 with a plurality of radially outwardly extending catches 111 snap-fit in corresponding openings 113 in the upper body 108 to connect them together. To retain one end of a spring 114 which yieldably biases the float assembly 100 toward its closed position, the lower body 106 preferably has an annular recess 116 formed therein. The other end of the spring 114 is preferably disposed over and retained by the circular recess 74 in the bottom wall 52 of the shell 32. The upper body 108 preferably has one or more through holes or slots 118 formed therein communicating the exterior of the float assembly 100 with the chamber 110 in which the second float 22 is received to permit fluid flow into the chamber 110. A through hole 120 is preferably provided in a nose portion 122 of the upper body 108 with the through hole 120 being generally aligned or coaxial with the vapor outlet 12 of the cap 60. The closure 18 is press-fit within the through hole 120 and is adapted to engage the valve seat 88 as shown in FIG. 4, when the first float 16 is moved sufficiently away from the bottom wall 52 of the shell 32. The passage 20 of the closure communicates with the vapor outlet 12 the chamber 110 even when the closure 18 is engaged with the valve seat 88. The closure 18 extends through the hole 120 and defines a second valve seat 123 in the chamber 110.

The second float 22 is slidably received within the chamber 110 and is preferably yieldably biased towards the closure 18 by a spring 124. The second float 22 has an annular recess 126 which retains one end of the spring 124 with the other end of the spring 124 retained on a circular projection 128 of the lower body 106 of the first float 16. The second float 22 is buoyant in liquid fuel such that when liquid fuel enters and rises in the chamber 110 the second float 22 is raised upwardly into engagement with the valve seat 123 of the closure 18 to seal off its passage 20. Desirably, the weight of the second float 22 is chosen such that when liquid fuel is no longer within the chamber 110 the weight of the second float 22 is sufficient to remove it from the valve seat 123 and reopen the passage 20 through the closure 18. The weight of the second float 22 and the spring rate of the spring 124 biasing it are also chosen such that if the vent valve 10 is turned over, such as during a vehicle roll-over accident, the second float 22 will be urged into engagement with the valve seat 123 of the closure 18 even when immersed in liquid fuel to prevent liquid fuel from flowing through the closure 18 and out of the vapor outlet 12. Likewise, the weight of the entire float assembly 100 and the spring rate of the spring 114 biasing it are chosen such that during a vehicle roll-over accident the first float 16 will be displaced to engage the closure 18 with the valve seat 88 of the cap 60 to prevent liquid fuel from flowing out of the vapor outlet therethrough. Desirably, to limit friction between the second float 22 and first float 16 the upper body 108 has a plurality of axially elongate and radially inwardly extending ribs 130. Likewise, to guide the first float 16 and reduce friction between it and the inner wall of the shell 32, a plurality of axially elongate and spaced apart ribs 132 are provided in the shell 32.

Accordingly, the vent valve 10 is comprised of a plurality of relatively simple components which are preferably snap-fit together for ease of assembly and manufacture. The vent valve 10 is constructed and arranged to limit or prevent liquid fuel from escaping from the fuel tank therethrough and is responsive to provide a two stage shut-off of the vapor valve outlet 12. Initially, when the closure 18 engages the valve seat 88 the passage 20 through the closure 18 remains open, and when the second float 22 is immersed in liquid fuel it is raised into engagement with the valve seat 123 of the closure 18 to prevent fluid flow through the closure 18, and hence, through the vapor outlet 12.

Operation

Absent liquid fuel acting on the float assembly 100, the closure 18 is not engaged with the valve seat 88 of the cap 60 and the second float 22 is likewise not engaged with the valve seat 123 of the closure 18 permitting fuel vapors within the fuel tank to flow through the vapor passage between the skirt 90 and sidewall 48 and out of the vapor outlet 12. Fuel vapor may also flow through the slots 50 in the shell 32 around the float assembly 100 and out of the vapor outlet 12, or through the float assembly 100 and the passage 20 through the closure 18 and out of the vapor outlet 12 for delivery to a fuel vapor canister or other vapor receiving component.

As liquid fuel is added to the fuel tank such as by a filler nozzle of a fuel station dispensing pump, the level of fuel in the tank rises and eventually liquid fuel will engage the bottom of the fill cup 34. As liquid fuel flows through the holes 46 in the bottom wall 44 of the fill cup 34 the valve disc 72 is raised into engagement with the bottom wall 52 of the shell 32 to close its holes 56 and prevent liquid fuel from entering the interior space 101 of the vent valve 10 therethrough. The level of fuel in the tank continues to rise as fuel is added therein until the level of fuel reaches the open upper end 39 of the fill cup 34. When the level of fuel is higher than the fill cup 34, fuel pours into the fill cup 34 and through the slots 50 in the shell 32 rapidly filling the interior space 101 of the vent valve 10 to the level of fuel in the tank.

Desirably, as liquid fuel fills the interior space 101, air is trapped within the lower body 106 of the first float 16 rendering the first float 16 and entire float assembly 100 buoyant or merely increasing its buoyancy if it is buoyant in liquid fuel. The rush of liquid fuel into the vent valve 10 and the air trapped in the float assembly 100 quickly raises the float assembly 100 until the closure 18 engages the valve seat 88 closing off a major portion of the vapor outlet 12. With the major portion of the vapor outlet 12 closed, the pressure within the fuel tank rises rapidly as fuel is added to the tank causing fuel to rise or back-up within the fill pipe to engage the fuel fill nozzle and actuate its automatic shut-off, temporarily stopping the addition of fuel to the tank. Because the passage 20 through the closure 18 remains open, fuel vapor may vent through the float assembly 100 and out of the vapor outlet 12 through this passage 20 to reduce the pressure within the fuel tank. Accordingly, when the pressure within the fuel tank has decreased sufficiently, additional fuel may be added to the fuel tank. The time required is dependent at least in part, on the flow area of the passage 20. The larger the flow area, the shorter the time needed to vent sufficient pressure from the tank, and vice versa. A currently preferred passage 20 has a diameter of about 0.10 of an inch.

Additional fuel added to the tank raises the level of fuel in the tank further, with fuel in the vent valve 10 rising correspondingly, until the fuel enters the chamber 110 containing the second float 22. Eventually, the second float 22 will be raised by liquid fuel within the chamber 110 until it engages with the valve seat 123 of the closure 18 to prevent any fluid flow through its passage 20. With the closure 18 engaged with the valve seat 88 and with the second float 22 engaged with the valve seat 123 of the closure 18, the vapor outlet 12 is completely closed. Without any exit for fuel vapor, the pressure within the fuel tank again rapidly increases and the fuel automatic shut-off of the nozzle is actuated by liquid fuel backing up into the fill pipe. Because the second float 22 may have been raised into engagement with the valve seat 123 of the closure 18 by splashing or sloshing fuel, it may fall away from this valve seat 123 when the fuel settles in the tank permitting additional fuel to be added to the fuel tank. When the level of fuel is such that the second float 22 remains engaged with the valve seat 123, no more fuel may be added to the fuel tank because of the lack of venting of fuel vapor and the resulting increased pressure in the fuel tank. The vapor outlet 12 remains completely closed until the level of fuel in the tank is decreased sufficiently to permit the second float 22 to fall away from the valve seat 123 thereby opening the passage 20 of the closure 18 and permitting fuel vapor to escape therethrough out of the fuel tank. At some point the decreased fuel level will also permit the first float 16 to fall away from the valve seat 88 due to the weight of the float assembly 100 and the force of gravity acting on the assembly. This removes the closure 18 from the valve seat 88 and fully opens the vapor outlet 12 to permit a high flow rate of fuel vapor to escape from the fuel tank.

Desirably, the vent valve 10 is constructed to at least substantially inhibit and preferably prevent escape of liquid fuel through the vapor outlet 12. Fuel splashing upwardly is prevented from entering the slots 50 of the shell 32 by the fill cup 34 which preferably extends at least as high as the slots 50. Further, the annular flange 58 of the sidewall 48 of the shell 32 prevents upwardly splashed or sloshing fuel from directly entering the vapor flow path between the skit 90 and shell 32. Still further, any fuel which bypasses the flange 58 and enters the space between the skirt 90 and shell 32 must travel laterally over the shell 32 and further upwardly to escape out of the vapor outlet 12. This is unlikely and due to the force of gravity acting on the fuel, any fuel which enters the shell 32 will flow downwardly towards the bottom of the shell 32 through the check valve 70 when the level of fuel in the fuel tank permits. Still further, the depending skirt 90 of the cap 60 provides a shield or baffle which prevents liquid fuel from laterally entering the shell 32 and escaping through the vapor outlet 12.

To change the fuel level within the tank which causes the first automatic shut-off of a fuel filler nozzle, the axial height of the side wall 38 of the fill cup 34 can be changed. Notably, the lower body 106 of the float assembly 100 is positioned at or below the level of the top of the fill cup 34 such that when fuel flows into the fill cup 34 the float assembly is raised relatively rapidly to engage the closure 18 with the valve seat 88 and initiate the first shut-off of the fuel filler nozzle. Accordingly, regardless of the rate at which fuel is added to the fuel tank, the height of the sidewall 38 of the fill cup 34 effectively controls the fuel level at which the first automatic shut-off of a fuel nozzle is obtained. Subsequent fuel fill levels which actuate subsequent shut-offs of the fuel filler nozzle can be controlled by the relative position and distance between the closure 18 and the second float 22 of the float assembly 100 and their position within the fuel tank because the buoyancy of the second float 22 (in addition to at least the spring force acting on the second float 22 and the weight of the second float 22) controls the subsequent automatic shut-offs of the fuel filler nozzle. Accordingly, a plurality of automatic shut-offs may be provided with overfilling of the tank being prevented by complete closure of the vapor outlet 12 to maintain a desirable vapor dome within the fuel tank.

Second Embodiment

As shown in FIGS. 5–6, a vapor vent valve 200 according to the invention may be included as a portion of a fuel pump module 14 mounted on a top wall 204 of and extending into fuel tank 206. The module 14 preferably has a flange portion 208 constructed to be mounted on and sealed to the fuel tank 206 such as by ultrasonic welding or other connection method, and a reservoir portion 210 connected to the flange portion 208 by one or more legs 212. Desirably, the reservoir portion 210 is slidable on the legs 212 and is yieldably biased away from the flange portion 208 to ensure that the bottom of the reservoir 210 is adjacent to a bottom wall of the fuel tank 206.

The module 14 preferably contains a plurality of components all received through a single opening in the fuel tank 206. For example, the module may contain an electric motor fuel pump 214, a fuel filter 216 downstream of the fuel pump outlet and upstream of an outlet 218 of the module 14 through which fuel is delivered from the fuel tank to an engine, a fuel pressure regulator 220 which may communicate with fuel in the fuel filter 216 downstream of the fuel pump 214, a fuel level sender (not shown) having a float responsive to the level of liquid fuel in the fuel tank, electrical connectors 224 permitting wires to pass through from outside of the fuel tank into the tank, such as to power the fuel pump 214 and communicate with the fuel level sensor and other sensors, and one or more sensors 222 which communicate conditions within the tank with a CPU or other processing unit of a vehicle. The vapor vent valve 200 may be carried by the flange portion 208 of the module 14 with a vapor outlet 226 defined and molded in the flange 208 and an exterior nipple 228 on the flange 208 suitable to receive a flexible hose communicating the vapor outlet 226 with a fuel vapor canister.

As best shown in FIG. 6, the vapor vent valve 200, when incorporated as a part of the fuel pump module 14, may have all of the same components as the vent valve 10 except for the cap 60. Desirably, the cap 60 can be replaced with structure integral with the flange portion 208 of the fuel pump module 14. For instance, the shell 32 may have outwardly extending catches 64 which snap-fits into corresponding openings 230 in a depending skirt 232 of the flange portion 208. Additionally, the vapor outlet 226 and a valve seat 234 surrounding the vapor outlet 226 may be integrally formed in the flange portion 208. Desirably, the depending skirt 232 of the flange portion 208 is constructed and arranged in the same manner as the skirt 90 of the cap 60 providing a relatively circuitous vapor flow path 235 between the skirt 232 and the shell 32 requiring fuel vapor to flow between the skirt 232 and shell 32 and up over the upper end 237 of the shell 32 before reaching the interior of the valve 10 and the vapor outlet 226. This at least substantially inhibits and preferably prevents liquid fuel from escaping through the vapor outlet 226. In all other respects, the vent valve 200 may be constructed and arranged as disclosed with regard to the first embodiment of the vent valve 10. Desirably, including the vent valve 200 as a portion of the fuel pump module 14 eliminates the need for a separate opening through the fuel tank 206 to accommodate the vent valve 200. Further, to prevent leakage of fuel from the fuel tank 206 during an accident, the legs 212 interconnecting the flange portion 208 and reservoir portion 210 of the fuel pump module 202 may be frangible or constructed to break during an accident to limit the maximum force on the flange portion 208 and the connection between the flange portion 208 and fuel tank. With the vapor vent valve 200 within the fuel pump module 14, the reservoir portion 210 and its contents, when they break away from the flange portion during an accident, are not flung into the vapor vent valve 200 and thereby eliminate the potential damage to the vent valve 200 and leakage from the fuel tank which otherwise may occur as a result thereof.

Third Embodiment

As an alternate embodiment, the vapor vent valve may be provided with a closure 18 having a through passage 20 of very small diameter, and preferably between about 0.020 and 0.040 of an inch to provide a more restrictive flow of fluid therethrough when the closure 18 is engaged with the vapor valve seat 88. Such an arrangement can be used with the stand alone vent valve 10 or with the vent valve 200 of the fuel pump module 14 without any other modifications. Desirably, upon filling of the fuel tank, the first shut-off of the fuel filler nozzle is obtained when the liquid fuel flows over the fill cup 34 and raises the closure 18 of the float assembly 100 into engagement with the valve seat 88 surrounding the vapor outlet 12. Due to the small flow area of the passage 20 through the closure 18, while fuel vapor may vent from the fuel tank, it does so at a relatively slow rate requiring a longer time to reduce the pressure in the fuel tank. Accordingly, with the relatively high pressure maintained in the fuel tank the fuel fill nozzle even if actuated will not add additional fuel to the tank.

Upon waiting a sufficient amount of time to permit a sufficient amount of the fuel vapor to flow through the passage, additional fuel may be added to the tank if desired, however, the pressure in the tank will rapidly increase and thereby rapidly cause a second shut-off of the fuel filler nozzle. Desirably, any additional fuel shut-offs after the first shut-off are created by the restricted flow rate of vapor through the passage 20 without the second float 22 closing off the passage 20 as in the previous embodiments. In any event, if sufficient fuel is added to the tank the second float 22 will close off the passage 20 when it is immersed in liquid fuel as in the previous embodiments. Additionally, the inner float 102 will close off the passage in a roll over accident situation as described with reference to the first embodiment vent valve 10. Desirably, a number of fuel shut-off events may occur before the second float 22 is immersed in liquid fuel. Preferably, the fuel tank is not filled to the point where the second float 22 is immersed in liquid fuel so that the passage 20 through the closure 18 remains open and the fuel vapor may vent from the fuel tank through this passage 20 even when the tank is filled to the desired maximum fill level.

Accordingly, a fuel vapor vent valve 10, 200 of relatively simple design is provided which at least substantially inhibits and preferably prevents the escape of liquid fuel therethrough, permits control of fuel shut-off events, permits control of a maximum fill level in the fuel tank, prevents fuel leakage during a vehicle roll over accident, is rapidly responsive and of relatively low cost to manufacture. Desirably, the vent valve 10, 200 can be a stand alone component separately mounted on the fuel tank or may be incorporated into a fuel pump module 14 mounted on the fuel tank.

Fourth Embodiment

Figure 7:
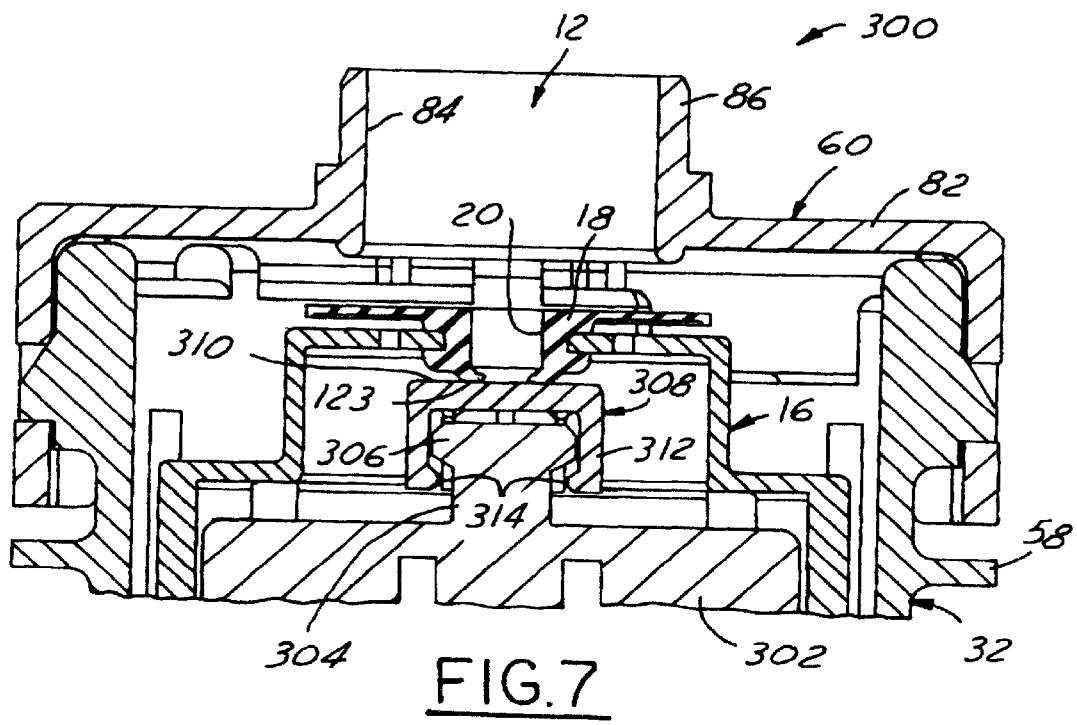
FIG. 7 is a fragmentary sectional view of a vapor vent valve assembly of a fourth embodiment of the invention.
Figure 8:
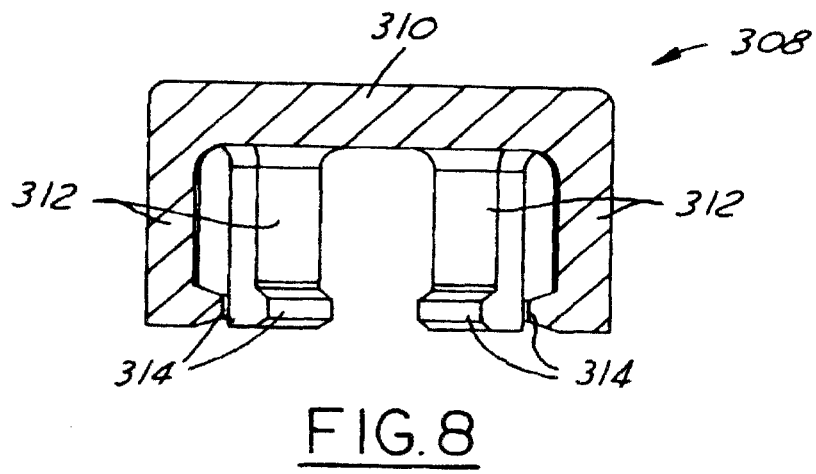
FIG. 8 is sectional view of a cage of the assembly of FIG. 7.

A vapor vent valve 300 according to a fourth embodiment of the invention, as shown in FIGS. 7 and 8, has a second float 302 carried in the first float 16 and having an upwardly projecting stem with an enlarged head 306 at one end and a cage 308 carried on the stem 304 for engaging the closure 18 and closing the vapor flow passage 20. The cage 308 preferably has an upper wall 310 and a plurality of circumferentially spaced arms 312 depending from the upper wall 310 and leading to radially inwardly extending fingers 314. The arms 312 have a length which permits axial movement of the cage 308 relative to the head 306 and the radially inwardly extending fingers 314 engage the head 306 to limit movement of the cage 308. The relative movement between the second float 302 and cage 308 provides for increased force tending to unseat the cage 308 from the closure 18 to prevent corking or sticking of the cage. Desirably, the length of each arm 312 is the same so that the head 306 engages the finger 314 on each arm 312 at essentially the same time to provide a generally uniform force on all arms 312 tending to unseat the cage 308 from the closure 18. In all other respects, the vapor vent valve 300 according to the fourth embodiment may be constructed in the same manner as the first embodiment or second embodiment vent valves 10, 200.

What is claimed is:

1. A vapor vent valve for a fuel tank, comprising:

a vapor outlet communicating an interior of the fuel tank with an exterior of the fuel tank and through which fuel vapor may flow out of the fuel tank;

a fill cup having an opening at one end and a sidewall extending to the open end;

a shell defining an interior space, disposed in part in the fill cup and having a sidewall with an opening therethrough and an upper edge;

a flow passage defined between the fill cup sidewall and the shell sidewall communicating with the opening of the fill cup and the opening through the sidewall to permit fluid which flows into the opening of the fill cup to enter the interior space through the opening in the sidewall of the shell;

a first float having an opening aligned with the vapor outlet, slidably received in the interior space and responsive to the level of liquid fuel in the interior space to partially close the vapor outlet at or above a certain first level of fuel in the fuel tank and permit fluid flow through the vapor outlet only through the opening in the first float;

a second float slidably received in the interior space, responsive to the level of liquid fuel in the interior space to close the opening in the first float when acted on by liquid fuel at or above a second level of fuel in the fuel tank to prevent fluid flow through the opening in the first float;

a baffle surrounding an upper portion of the shell including the upper edge of the shell; and a vapor flow path communicating with the interior of the fuel tank at a location above the second level and having an inlet defined at least in part between the baffle and the shell disposed under the upper edge of the shell, and having a portion defined above the upper edge of the shell with the vapor outlet and shell arranged so that in order for fluid in the fuel tank to reach the vapor outlet through the vapor flow path, the fluid must travel upwardly between the baffle and shell, laterally over the edge of the shell, further laterally to the vapor outlet and upwardly to flow through the vapor outlet, permitting fuel vapor to exit the fuel tank while preventing liquid fuel flow through the vapor outlet.

2. The valve of claim 1 which also comprises a bottom wall of the shell defining in part the interior space and a check valve which prevents liquid fuel flow from the fuel tank into the interior space through the opening in the bottom wall of the shell and permits liquid fuel flow from the interior space to the fuel tank under at least some fuel level conditions in the fuel tank.

3. The valve of claim 2 wherein the check valve comprises a disk buoyant in liquid fuel which when immersed in liquid fuel s raised into engagement with the bottom wall of the shell to close the opening in the bottom wall.

4. The valve of claim 3 wherein the fill cup has a bottom wall with an opening therethrough and the check valve is disposed between the bottom wall of the fill cup and the bottom wall of the shell.

5. The valve of claim 1 wherein the first float has an inner chamber and the second float is slidably carried in the inner chamber of the first float.

6. The valve of claim 5 which also comprises a closure carried by the first float, the closure having a passage therethrough defining the opening through the first float, and the second float is engageable with the closure to close the passage in response to certain liquid fuel level conditions in the inner chamber.

7. The valve of claim 6 wherein the closure defines a valve seat surrounding the passage and engageable by the second float.

8. The valve of claim 1 wherein the shell has an outwardly extending flange which directs liquid fuel landing on the flange away from the opening of the fill cup.

9. The valve of claim 8 wherein the flange extends radially outwardly from the shell to a distance at least equal to the radial distance between the baffle and shell so that any fuel flowing out of the vapor flow path flows on the flange and is directed by the flange back to the fuel tank.

10. The valve of claim 5 wherein the first float has an opening communicating the interior space with the inner chamber.

11. The valve of claim 1 which also comprises a cap attached to the shell and having an opening defining the vapor outlet.

12. The valve of claim 11 wherein the cap has a depending skirt defining the baffle.

13. The valve of claim 11 wherein the cap has mounting tabs extending therefrom connectable to a wall of the fuel tank.

14. The valve of claim 1 wherein the shell is connectable with a flange portion of a module carried by the fuel tank and the vapor outlet is defined in the flange portion.

15. The valve of claim 1 wherein the opening in the sidewall of the shell is at a height at or below the uppermost extent of the sidewall of the fill cup.

16. The valve of claim 6 wherein the second float also comprises a cage carried by the second float and engageable with the closure to close the passage through the closure in response to certain liquid fuel level conditions in the inner chamber.

17. The valve of claim 16 wherein the second float is movable relative to the cage and the cage has a plurality of arms of substantially the same length and fingers carried by the arms engageable with the second float to limit relative movement between the cage and second float.

18. A fuel pump module extending at least in part into a fuel tank, comprising:

a flange portion connectable to a wall of the fuel tank and having a vapor outlet extending therethrough and an annular depending skirt extending into the fuel tank when the flange portion is mounted to the fuel tank;

a reservoir portion carried by the flange portion and disposed in the fuel tank when the flange portion is mounted to the fuel tank;

a vent valve carried by the flange portion and having:
a shell connectable to the flange portion with an upper portion of the shell including an upper edge of the shell within and adjacent to the skirt, said shell defining an interior space and having a sidewall with an opening therethrough;

a fill cup having a sidewall and an open end, the fill cup is received at least in part around the sidewall of the shell;

a flow passage defined between the fill cup sidewall and the shell sidewall, and communicating the opening of the fill cup with the opening through the sidewall to permit fluid which flows into the opening of the fill cup to enter the interior space through the opening in the sidewall of the shell;

a first float having an opening aligned with the vapor outlet, slidably received in the interior space and responsive to the level of liquid fuel in the interior space to partially close the vapor outlet at or above a certain first level of fuel in the fuel tank and permit fluid flow through the vapor outlet only through the opening in the first float; and a second float slidably received in the interior space, responsive to the level of liquid fuel in the interior space to close the opening in the first float when acted on by liquid fuel at or above a second level of fuel in the fuel tank to prevent fluid flow through the opening in the first float, whereby fuel which flows over the sidewall of the fill cup and into the opening of the fill cup rapidly fills the interior space with liquid fuel to the same height as the liquid fuel in the fuel tank so that the float assembly is rapidly responsive to the fuel level in the fuel tank when the fuel level in the fuel tank is above the sidewall of the fill cup.

19. The valve of claim 18 wherein the first float has an inner chamber and the second float is slidably carried in the inner chamber of the first float.

20. The valve of claim 18 which also comprises a closure carried by the first float, the closure having a passage therethrough defining the opening through the first float, and the second float is engageable with the closure to close the passage in response to certain liquid fuel level conditions in the inner chamber.

21. The valve of claim 20 wherein the closure defines a valve seat surrounding the passage and engageable by the second float.

22. The valve of claim 19 wherein the first float has an opening communicating the interior space with the inner chamber.

23. The valve of claim 20 wherein the second float also comprises a cage carried by the second float and engageable with the closure to close the passage through the closure in response to certain liquid fuel level conditions in the inner chamber.

24. The valve of claim 23 wherein the second float is movable relative to the cage and the cage has a plurality of arms of substantially the same length and fingers carried by the arms engageable with the second float to limit relative movement between the cage and second float.

25. A vapor vent valve for a fuel tank, comprising:

a vapor outlet through which fuel vapor may flow out of the fuel tank;

a fill cup having an open end and a continuous imperforate sidewall leading to the open end;

a shell disposed in part in the fill cup, defining at least in part an interior space and having an opening therethrough communicating with the open end of the fill cup, the opening being shielded from splashing liquid fuel by the fill cup;

a first float having an opening aligned with the vapor outlet, slidably received in the interior space and responsive to liquid fuel in the interior space at least when said liquid fuel is at a level above the fill cup sidewall to partially close the vapor outlet at or above a certain first level of fuel in the fuel tank and permit fluid flow through the vapor outlet only through the opening in the first float; and a second float slidably received in the interior space, responsive to a level of liquid fuel in the interior space above that which causes the first float to partially close the vapor outlet, and closing the opening in the first float when acted on by liquid fuel at or above a second level of fuel in the fuel tank to prevent fluid flow through the opening in the first float.

26. The valve of claim 25 wherein the first float has an inner chamber and the second float is slidably carried in the inner chamber of the first float.

27. The valve of claim 26 which also comprises a closure carried by the first float, the closure having a passage therethrough defining the opening through the first float, and the second float is engageable with the closure to close the passage in response to certain liquid fuel level conditions in the inner chamber.

28. The valve of claim 26 wherein the first float has an opening communicating the interior space with the inner chamber.

29. The valve of claim 27 wherein the second float also comprises a cage carried by the second float and engageable with the closure to close the passage through the closure in response to certain liquid fuel level conditions in the inner chamber.

30. The valve of claim 29 wherein the second float is movable relative to the cage and the cage has a plurality of arms of substantially the same length and fingers carried by the arms engageable with the second float to limit relative movement between the cage and second float.

* * * * *

UNITED STATES PATENT AND TRADEMARK OFFICE
CERTIFICATE OF CORRECTION

PATENT NO. : 6,311,675 B2  
DATED : November 6, 2001  
INVENTOR(S) : Lynwood F. Crary et al.

Page 1 of 1

It is certified that error appears in the above-identified patent and that said Letters Patent is hereby corrected as shown below:

<u>Column 11</u>,  
Line 31, delete "s" and insert -- is --.

Signed and Sealed this

Nineteenth Day of March, 2002

Attest:

JAMES E. ROGAN  
*Attesting Officer*    *Director of the United States Patent and Trademark Office*